United States Patent [19]
Brusasco et al.

[11] Patent Number: 5,250,771
[45] Date of Patent: Oct. 5, 1993

[54] MANUALLY CONTROLLED KEY DEVICE

[75] Inventors: Enzo Brusasco, Turin; Giuseppe Boero, Candiolo, both of Italy

[73] Assignee: Roltra-Morse S.p.A., Cascine Vica-Rivoli, Italy

[21] Appl. No.: 752,568

[22] PCT Filed: Mar. 6, 1990

[86] PCT No.: PCT/IT90/00022
§ 371 Date: Sep. 9, 1991
§ 102(e) Date: Sep. 9, 1991

[87] PCT Pub. No.: WO90/10558
PCT Pub. Date: Sep. 20, 1990

[30] Foreign Application Priority Data
Mar. 7, 1989 [IT] Italy .................. 52925/89[U]

[51] Int. Cl.$^5$ .................................. H01H 21/00
[52] U.S. Cl. ........................ 200/553; 200/292;
200/512; 200/61.62; 200/61.69; 200/61.73;
200/308; 200/61.54; 200/5 A
[58] Field of Search ......... 200/292, 512, 553, 61.58 R,
200/61.62, 61.69, 61.73, 308, 61.54, 5 A

[56] References Cited
U.S. PATENT DOCUMENTS

| | | | |
|---|---|---|---|
| 4,131,772 | 12/1978 | Weckenmann et al. | 200/61.54 |
| 4,379,973 | 4/1983 | Turner et al. | 200/292 X |
| 4,697,092 | 9/1987 | Roggendorf et al. | 200/61.54 X |
| 4,701,629 | 10/1987 | Citroën | 200/61.54 X |
| 5,053,592 | 10/1991 | Zuercher | 200/5 A X |

Primary Examiner—Allan N. Shoap
Assistant Examiner—Paul A. Schwarz
Attorney, Agent, or Firm—Sixbey, Friedman, Leedom & Ferguson

[57] ABSTRACT

A device (301) having manually controlled keys (310), in particular for controlling actuator devices of a motor vehicle, particularly for electric window winders and/or electric door locks and/or electric rearview mirrors, comprising means (317, 305) operative to determine at least one electrical signal in dependence on the operation of at least one of these keys (310) and including a specific electronic unit (27) for processing this electric signal for the respective actuator device, in which the electronic unit (27) includes an integrated circuit (25) for treatment of the information signals relating to the operation of the actuator device, the integrated circuit (25) being connected to a printed circuit (305) which is common to means (317, 305) operable to determine at least one electric signal in dependence on the operation of at least one of the keys (310), and both the printed circuit (305) and the integrated circuit (25) are housed in integral portions (380, 320) of the frame (302) of the device (301).

17 Claims, 2 Drawing Sheets

5,250,771

MANUALLY CONTROLLED KEY DEVICE

TECHNICAL FIELD

The present invention relates to a device having manual control keys, in particular to a device of the type for controlling at least one actuator device in a vehicle, particularly for electric window winders and/or electric door locks and/or electric rear view mirrors, in which a DC electric motor is driven to actuate the displacement of an associated actuation member.

BACKGROUND ART

As is known, currently for the control and drive of such actuator devices conveniently fitted on vehicles, and in particular motor vehicles, use is made in practice of a wiring system having wires dedicated to supplying electricity to the motor, which wires lead from a common central control unit for various actuator devices which include relay units, limiter circuits etc. This wiring system involves various disadvantages of a general character such as: the complexity and difficulty of fitting bundles of cables, the large number of electrical connections, the difficulty of identification of breakdowns, and the complexity of tests for operation of the installation during and/or after assembly to the vehicle, and in particular involve disadvantages for the control key device in that the full power current flows through them.

DISCLOSURE OF INVENTION

The object of the present invention is that of providing a manual control key device for controlling at least one actuator device, particularly in a motor vehicle, which can be produced and assembled very simply and with a high level of functional reliability, suited to a drive and control system which overcomes the above-indicated disadvantages, in particular a system of the type described in Italian Patent application entitled "A Control System for a Plurality of Electrical Devices in a Vehicle" filed on the same date.

According to the present invention there is provided a manual key control device for controlling at least one actuator device, comprising means operable to determine at least one electrical signal in dependence on the operation of at least one of the said keys, characterised by the fact that it includes a specific electronic processing unit for processing the said electrical signal for the said actuator device.

BRIEF DESCRIPTION OF DRAWINGS

For a better understanding of the present invention a particular embodiment thereof will now be described, purely by way of non-limitative example, with reference to the attached drawings, in which.

BEST MODE FOR CARRYING OUT THE INVENTION

Figures 1, 2:
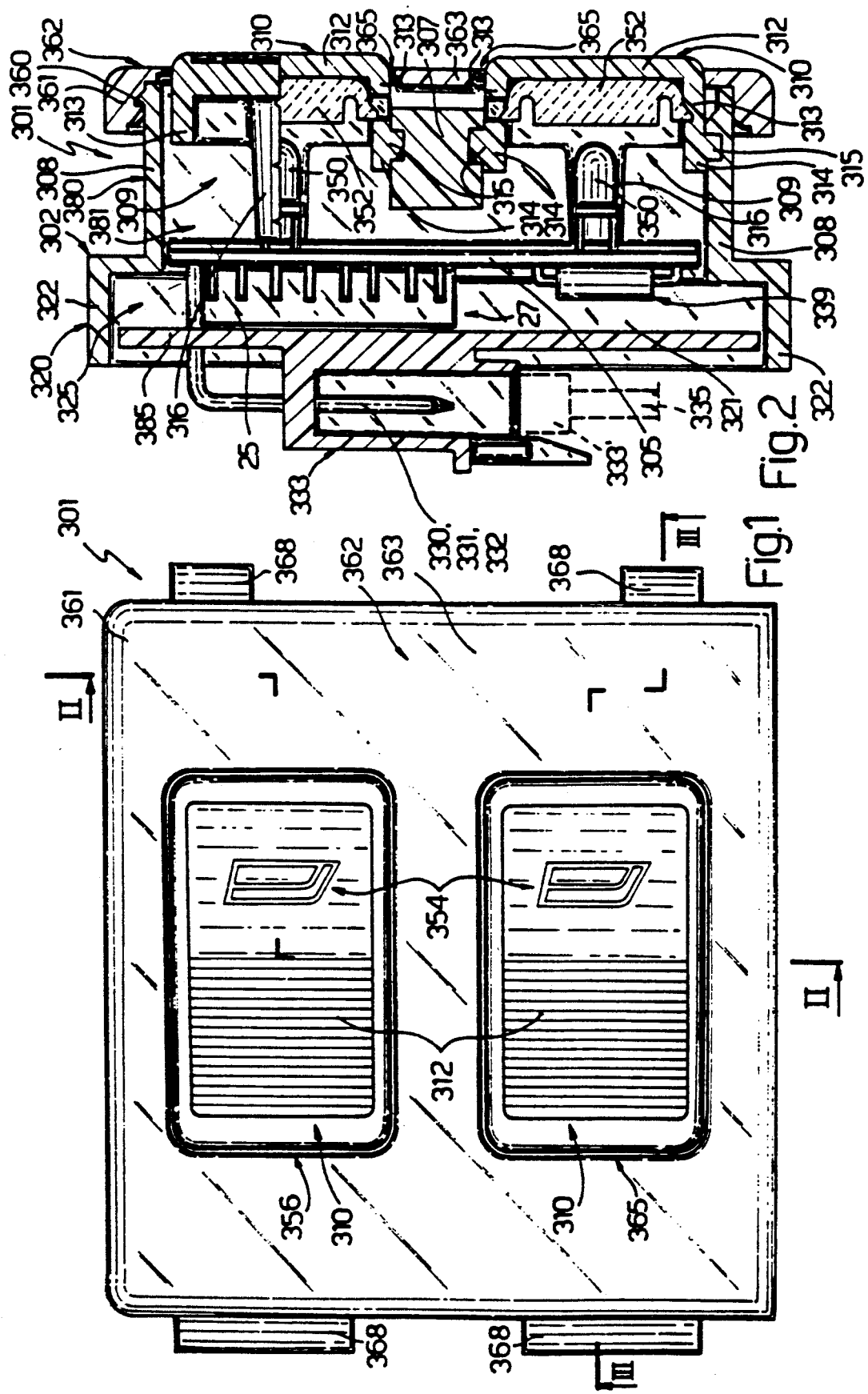
FIG. 1 is a view from above of a manual key control device formed according to the principles of the present invention.
FIGS. 2 and 3 are respective sectional views taken on the lines II—II and III—III of the key device of FIG. 1.
Figure 3:
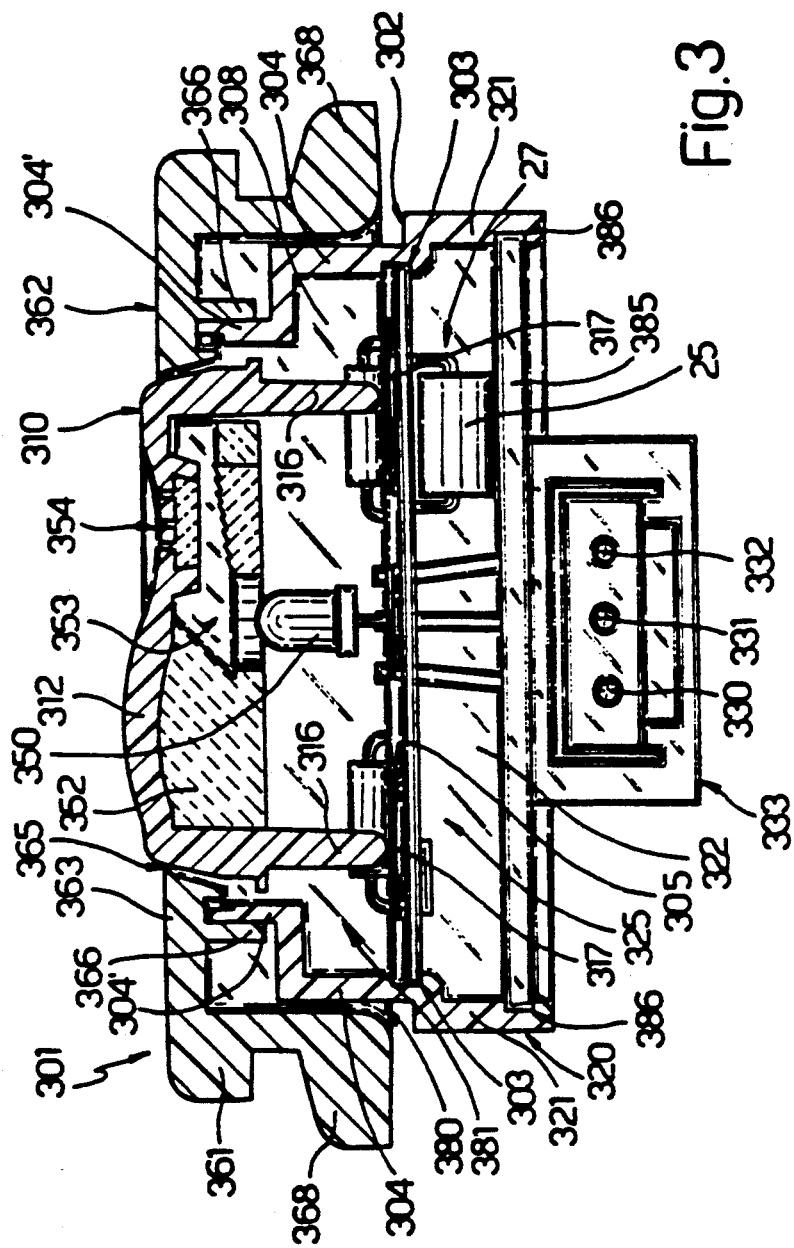

With reference to Figures from 1 to 3, the reference numeral 301 generally indicates a manually controlled key device which comprises, in a substantially known way, a main frame 302 in the form of a shaped container with a substantially square section, conveniently made of plastics material, having a central portion 380 which defines an internal space 381 by two pairs of parallel vertical, respectively orthogonal walls 304 and 308; in the internal face of the two facing parallel vertical walls 304 are formed two horizontal grooves 303 which serve as housings for lateral edge zones of a printed circuit board 305 which is thus disposed horizontally in the main plane of the frame 302.

From the upper region of this frame 302 extend two facing parallel vertical walls 304' at a relative distance less than that between the walls 304, and between these walls 304', in the middle zone thereof, there is a horizontal square section portion 307 the relative dimensions of the side of which are greater than the thickness of the walls 304' so that between this horizontal portion 307 and the associated vertical walls 308 of the frame 302, perpendicular to the walls 304 and 304', there are two spaces 309 in which are housed respective manually operable rocker type keys 310. These keys 310 have an upper portion 312 with an undulating surface and are of substantially rectangular form with their major sides extending perpendicularly between the walls 313 which, in the middle region, have respective lower projections 314 extending outwardly with respect to pivot pins 315 which, conveniently, snap-engage into respective cavities in the walls 308 and the horizontal portion 307.

Downwardly from each key 310, from the two end regions of the upper portion 312, extend respective legs 316 which, in the rest position engage against respective flexible conductor elements 317 commonly known as "bubble switches" which in the rest position contact only perimetrally on the upper face of the printed circuit 305 which supports them. When a pressure is exerted on element 317 from above (by the thrust exerted by the respective contact leg 316 when the key 310 is made to rotate in one of the two possible directions), they deform achieving electrical contact on the printed circuit 305 with their central portion thus causing an electrical signal indicative of the command movement effected with the key 310. When the pressure on these elements 317 ceases, to allow the key 310 to return to its stable rest position, they also return into the stable position resting only on their perimeters.

On the upper face of the printed circuit 305 there are also connected two respective light emitting diodes (LED) 350 which are orientated upwardly and in correspondence with the central region of the upper portion 312 of each key 310; in particular, each key 310 has, beneath the upper portion 312, a snap-engaged portion 352 of plastics material which defines within it a shaped channel 353 for conveying the light energy from the central region overlying the light emitting diode 350 towards a region 354 of the upper portion 312 of the key 310 where there is schematically indicated the symbol of the actuator which the key 310 is adapted to control (in the specific case illustrated this actuator is an electric window operator).

Near their tops the walls 308 have external projections 360 which are snap-engageable with respective seats formed in the inner face of an upper perimetral edge 361 of an external cover plate 362 of the device 301, which has a square, flat upper portion 363 of dimensions very slightly greater than the upper dimensions of the frame 302 so as to cover it completely, and with two spaces 365 from which the upper portions 312 of the keys 310 project. Downwardly from the lower surfaces of the flat portion 363 of the plate 362 extend two walls 366 which couple on the outer surface of the upper portions of the walls 304' whilst downwardly from the lower surfaces of the two opposite sides of the perimetral edge 361 extend respective pairs of external projections 368 for snap-engaging onto a convenient support, for example the door of a motor vehicle.

According to the present invention this frame 302 integrally includes, below the central portion 380, formed by the walls 304 and 308, a portion 320 formed by two pairs of parallel vertical, respectively orthogonal pairs of walls 321 and 322, which form a second space 325 underlying the space 381.

Within this space 325 there is housed an electronic unit 27 for the treatment of control information signals for the actuators, produced by actuation of the keys 310, according to the system described in the said Italian Patent application entitled "A Control System for a Plurality of Electric Devices on a Vehicle", and the contents of which are incorporated herein by reference. In particular, this unit 27 utilises the lower face of the printed circuit board 305 already present in the device 301 for the operation of the flexible conductor elements 317, and to this printed circuit-305 there are connected:

- three electrical contact element 330, 331 and 332, conveniently of cylindrical type, which are housed in a connector portion 333 which extends centrally and below a flat, Substantially square plate 385 which has a pair of opposite lateral edges which are housed in respective horizontal grooves 386 formed in the inner face of the pair of walls 321; this connector 333 is adapted to couple with a corresponding connector block 333' (illustrated in broken outline) at the end of an electrical cable 335 having three electrical conductors a first of which is a power level positive electric supply line, the second of which is an information signal transmission line, and the third of which is ground connection line. This electrical cable 335 conveniently extends from a main central control unit, including a microprocessor, towards this device 301 conveniently disposed in a vehicle door; and
- an integrated circuit 25 for the treatment of information signals relating to the actuation of the keys 310. This integrated circuit 25 can conveniently include specific logic circuits or a microprocessor, solid state switches etc, and can perform an overload current and overload voltage protection circuit, diagnostic and monitoring circuits etc, also in combination with other discrete circuit components 339, also connected to the printed circuit 305.

INDUSTRIAL APPLICABILITY

The advantages obtained with the key device of the present invention are evident from what has been described in that, thanks to the electronic unit 27 which allows the information signals relating to the operation of the keys 310 to be processed without these keys having to be directly connected to the power supply cables to the associated actuators, the assembly and reliability of the control system is considerably simplified by the significant reduction in the number of connection wires as well as the associated connections; moreover this electronic unit 27 makes it possible to provide a malfunction diagnostic function and to have a greater safety in operation of the vehicle in that possible anomalies can be indicated in good time to the driver, and offers a reduction in repair times in that the repair engineer can be given an indication of the type of anomaly. All this obviously translates into a simplification of testing both on the assembly line and at the end of the line. The provision of a specific electronic unit 27 for this device 301 also makes it possible to vary the type of operation of the type of device itself with the simple modification of the specific electronic unit and, possibly, of the central unit. The housing of this electronic unit 27 is moreover achieved in an economic way both because the same printed circuit board 305 already present in conventional devices is utilised and because it involves only a simple modification to the conventional frame by means of the integral portion 320 which does not substantially alter the most critical dimensions of the device 301 which, therefore, can still be housed in the door in the usual position. Such a frame 302 could therefore also be used for devices 301 whether or not they have the electronic unit 27.

Finally, it is clear that the embodiment of the present invention described and illustrated can have modifications and variations introduced thereto which do not depart from the ambit of the inventive idea contained in it. For example the configuration of the integral portion 320 and the manner of housing of the integrated circuit 25 can be varied, as can the number of electrical contact elements of the connector 33 and the number and configuration of the keys 310 and associated flexible conductor elements 317, which could be replaced by soft touch keys.

We claim:

1. A manually controlled key device comprising
    a main frame formed by two pairs of walls, the walls of one pair being orthogonal to the walls of the other pair,
    a cover plate, said cover plate extending generally orthogonally to the pairs of walls of the main frame in a manner covering a first open end of the main frame, and having connection means for removably connecting the cover plate to the main frame;
    at least one aperture in the cover plate;
    a printed circuit board, mounted in said main frame and extending substantially orthogonal to the pairs of walls of the main frame and dividing the interior of the main frame into a first and a second space;
    at least one key, partially accommodated in the at least one aperture of the cover plate, said key including an actuation portion which slightly protrudes outwardly from the cover plate, support means which cooperates with the main frame for supporting the key in a displaceable manner, and at least one leg which protrudes into the first space of the main frame;
    electrically conductive, elastically resilient contact means, supported by said printed circuit board and arranged in said first space in a position facing said leg of the key, the resilient contact means being displaceable by said leg upon actuation of the key, for opening and closing an electrical path of the printed circuit board;
    an electronic unit supported by and electrically connected to said printed circuit board, said electronic unit being arranged in said second space and processing an electrical signal received from said printed circuit board in response to displacement of said contact means by manual displacement of the key and generating information signals for an actuator device as a result thereof.

2. A manually controlled key device according to claim 1, wherein said at least one aperture comprises a pair of apertures in the cover plate, and said at least one key comprises a pair of keys, each of said keys being partially accommodated in each of the apertures, a relatively thick separating portion being provided on the cover plate in a middle area between the apertures and projecting into the first space between side walls of the actuating portion of the keys.

3. A manually controlled key device according to claim 2, wherein said keys are rocker type keys, each of which is pivotably supported on a respective one of the walls of the main frame and a respective side of said separating portion in a manner allowing the key to rock between a rest position and two operative positions.

4. A manually controlled key device according to claim 3, wherein the at least one leg of each key comprises a pair of legs, and wherein each of said legs acts on a respective said resilient contact means.

5. A manually controlled key device according to claim 1, wherein the at least one leg of said key comprises a pair of legs, and wherein each of said legs acts on a respective said resilient contact means.

6. A manually controlled key device according to claim 1, wherein at least one light emitting element is disposed on a side of the printed circuit board which faces said cover plate, and wherein said at least one key has a light transmissible portion.

7. A manually controlled key device according to claim 6, wherein said at least one key has a light conveying part attached to an underside thereof, said light conveying part having a light conveying channel formed therein, and said light conveying channel extending from a first area overlying said light emitting element to a second area underlying said light transmissible portion for conveying light energy produced by the light emitting element from said first area to said second area and enabling the emission thereof through the key.

8. A manually controlled key device according to claim 7, wherein the light transmissible portion of the key is in the shape of a schematic representation of the actuator device for which the information signals are generated by the electronic unit in response to displacement of the key.

9. A manually controlled key device according to claim 1, wherein said electronic unit comprises logic circuits.

10. A manually controlled key device according to claim 1, wherein said electronic unit comprises diagnostic and monitoring circuits.

11. A manually controlled key device according to claim 1, wherein said electronic unit comprises a connector having at least three external connection elements for external connection to an electrical connection cable including at least a first power lever positive electrical supply conductor, a second information signal transmission conductor, and a third ground connection conductor.

12. A manually controlled key device according to claim 1, wherein said elastically resilient contact means is a switch.

13. A manually controlled key device according to claim 1, wherein said switch is a bubble switch.

14. A manually controlled key device according to claim 1, wherein said at least one key controls at least one of an actuator device for an electric window, an actuator device for adjusting the orientation of an electric rear view mirror, and an actuator device for an electrical lock.

15. A manually controlled key device according to claim 1, further comprising a second cover plate, said cover plate extending generally orthogonally to the pairs of walls of the main frame in a manner covering a second open end of the main frame, and being detachably connected to the main frame.

16. A manually controlled key device according to claim 15, wherein a lower side of the second cover plate has thereon a connector housing for removably retaining a connector of an electrical cable therein coupled with electrical connection elements of the electronic unit, said electrical connection elements extending from the printed circuit board, across the second space, through the second cover plate and into the connection housing.

17. A manually controlled key device according to claim 1, wherein the cover plate has two side walls which are disposed inwardly of a perimetral edge of the cover plate and which mount onto outer surface portions of the walls of one of said pair of walls of the main frame; and wherein pairs of attachment members extend from said perimetral edge in a direction generally parallel to the side walls of cover plate into a position for holding the key device to a vehicle body part into which said main frame has been inserted.

* * * * *